United States Patent
Snackers et al.

[11] Patent Number: 6,004,045
[45] Date of Patent: Dec. 21, 1999

[54] OPTICAL CONNECTOR

[75] Inventors: Hans-Juergen Snackers, Sulz; Emmerich Mueller, Aidlingen, both of Germany

[73] Assignee: Hewlett-Packard Company, Palo Alto, Calif.

[21] Appl. No.: 08/879,170

[22] Filed: Jun. 19, 1997

[30] Foreign Application Priority Data

Aug. 19, 1996 [EP] European Pat. Off. .............. 96113242

[51] Int. Cl.⁶ ............................... G02B 6/00; G02B 6/36
[52] U.S. Cl. ........................................................... 385/92
[58] Field of Search .................................... 385/80–89

[56] References Cited

U.S. PATENT DOCUMENTS

| | | | |
|---|---|---|---|
| 4,844,582 | 7/1989 | Giannini | 385/88 |
| 5,499,311 | 3/1996 | DeCusatis | 385/88 |

FOREIGN PATENT DOCUMENTS

| | | | |
|---|---|---|---|
| 0297439 | 6/1988 | European Pat. Off. | 385/88 |
| 297439A2 | 6/1988 | European Pat. Off. | |
| 0713111 | 7/1995 | European Pat. Off. | 385/89 |
| 713111A1 | 11/1995 | European Pat. Off. | |

*Primary Examiner*—Akm E. Ullah

[57] ABSTRACT

A device optically connects one end of an optical fiber with an optical component. The device includes an adapter with a guide extending in the direction of the optical component and holding the optical fiber in a predetermined position relative to an optical axis of the optical component. The adapter includes a portion with a cross-section which is non-symmetrical and engages with a counterpart of the optical component. The device does not comprise wearing parts, like threads in known connectors, can be easily plugged in the optical component and is fixed by magnets.

10 Claims, 1 Drawing Sheet

OPTICAL CONNECTOR

FIELD OF THE INVENTION

The present invention relates to optical connectors. More specifically, the invention relates to a device for optically connecting one end of an optical fiber with an optical component.

BACKGROUND OF THE INVENTION

Basically, optical fiber connectors comprise a plug and a socket. Plug and socket are fixed together by means of threads and an optical fiber is fixedly arranged axially in the plug.

U.S. Pat. No. 5,247,595 regards an optical connector for optically connecting an end portion of an optical fiber with a spherical lens. A retainer fixes the end portion of the optical fiber. The position of the retainer is fixed in relation to the spherical lens by means of a conical surface on the retainer tapering in the direction of the spherical lens.

These known optical connectors require an assembling time which is insufficiently long.

Thus, there is a need for a new device for optically connecting one end of an optical fiber with an optical component requiring a short assembling time.

SUMMARY OF THE INVENTION

The present invention relates to the above need and provides a reliable device for an optical connection of one end of an optical fiber with another optical component. The optical connection can be made within a short time. Its basic features are:

- an adapter with a guidance extending in the direction of the optical component,
- the guidance holds the optical fiber in a predetermined position relative to an optical axis of the optical component,
- the adapter comprises at least a portion with a cross-section being non-symmetrically, and
- the portion engages in a counterpart of the optical component.

It is the core of the invention to connect an end of an optical fiber with an adapter which comprises a body with a shape which is not symmetrically. This body or a part of it being not symmetrically, engages in a counterpart of the optical component to be connected with the end of the optical fiber. The non-symmetrical portion of the adapter only fits together with the counterpart of the optical component when brought together under a well-defined orientation to each other. By these features according to the invention, a reproducible orientation and optical connection of the connected optical element in relation to the end of the optical fiber is achieved.

Complicated and time consuming rotational movements are replaced by straightforward plug-in. This has the further advantage that the end of the optical fiber is not twisted when being connected to an optical component as might happen when the optical connection is made by means of threads. When the inventive device is used to connect one end of an optical fiber with another optical component during normal operation of the fiber, the end of the optical fiber may be easily disconnected from the optical component and the device or adapter according to the invention can be connected directly to a measuring instrument to test the fiber or the network without the need to take further measures. If the device is used under heavy operation conditions, it may be appropriate to provide the device or adapter with a clamp or the like, engaging in the optical component or vice versa to assure constantly a proper connection during operation.

The device or adapter according to the invention makes sure that an end of an optical fiber is always connected to a measuring instrument or an optical head at the same angle and that no freedom in terms of rotation occurs. The device allows a reproducible connection, even if the adapter or device is removed several times. This is of particular importance for connectors with inclined ferule end faces.

Since the inventive device does not comprise wearing parts, like threads in known connectors, no attrition will occur and the inventive device may be connected and disconnected from an optical component without losing reproducibility of the optical connection.

Because of the simple geometry, the device according to the invention can be easily produced and thus is cost effective.

According to one embodiment of the invention, the adapter, holding one end of an optical fiber, is connected with an optical measuring instrument, such as an optical power sensor. It will be understood that a reproducible alignment of the end of the optical fiber to a photo diode of the optical power sensor is important for accurate and reproducible measurements.

According to a further embodiment of the invention, the housing of the optical component to be connected with one end of an optical fiber, comprises a cross-section with the same shape as the non-symmetrical portion of the adapter, holding the end of the optical fiber. The non-symmetrical portion of the housing constitutes a counterpart, exactly fitting together with the non-symmetrical portion of the adapter at a well-defined orientation to each other.

In another embodiment of the invention, a spacer element is arranged between the adapter, holding one end of an optical fiber, and the optical component to be optically connected with the end of the optical fiber. Such spacer element may be necessary to bring the end of the optical fiber in the focus of a lens or in the correct position relative to a photo diode of the optical component etc. The invention proposes to use a spacer element which comprises a counterpart engaging in the adapter and a second portion being non-symmetrical relative to the optical axis of the optical fiber and engaging in the counterpart of a further optical component, such as an optical power sensor or another measurement instrument.

According to a preferred embodiment of the invention, the non-symmetrical portion of the adapter fitting into another optical component, has the same dimensions as the counterpart of the spacer element and of another optical component to be connected with the adapter either directly or via the spacer element. If the non-symmetrical portion of the adapter and its counterparts on spacer element and optical component are of the same dimensions, several optical connections can be made with a few optical components comprising the geometry as proposed by the invention. By matching shapes, theoretically any number of spacer elements can be arranged in a row for simultaneous use, depending on the necessary distance between the end of the optical fiber and the optical component.

It will be understood that the spacer element or ring may show various diameters and lengths, depending on the available space and the necessary optical distance of the optical component to be connected with the end of an optical fiber.

In a preferred embodiment of the invention, the adapter or the spacer element comprises a lifted D-shaped portion engaging in a recessed counterpart of another optical component, such as an optical sensor. A D-shaped portion makes it easily visible for an operator how to connect the device according to the invention with another optical component. It will be understood that any other non-symmetrical geometry of the adapter allowing an operator to see how the device shall be connected to another optical component may be appropriate.

In one embodiment of the invention, the lifted D-shaped portion or the entire adapter, spacer element or optical fitting is made of a ferromagnetic material engaging in the counterpart of another optical component by means of a magnetic force. It is preferred to use a non-symmetrical portion and a counterpart each comprising a plane surface allowing a reproducible optical connection. Further, in one or more of the plane surfaces, magnets may be arranged allowing an easy connection of the parts to be connected. In order to assure that the optical connections being made by the device are reproducible, it may be appropriate to arrange the magnets below one or more of the plane surfaces and thereby avoiding any negative influence on the well-defined contact of the plane surfaces of the lifted D-shaped portion and its counterpart.

A further option is to cover the adapter, spacer element or optical component entirely or partly with plastic. This may be appropriate to avoid a short circuit, corrosion or to fix the magnets in the plane surfaces.

It is understood and expressly noted that the present invention relates to all useful and novel combinations of the above disclosed features, whether alone or in any other arbitrary combination. Furthermore, all cited advantages can also be seen as objects solved by the invention in its entirety.

BRIEF DESCRIPTION OF THE DRAWINGS

The invention will now be explained, by means of a non-limiting example, with reference to the accompanying drawings, in which:

FIG. 1 shows a front view of an adapter 7, a spacer ring or spacer element 4 and an optical power sensor 1. Adapter 7 comprises a guidance 6 extending in the direction of the optical power sensor 1 and holding one end of an optical fiber 11 in a predetermined position relative to the surface of a photo diode 2 of the optical power sensor 1. Adapter 7 is of non-symmetrical shape around the axis of the optical fiber 11.

Figure 1:
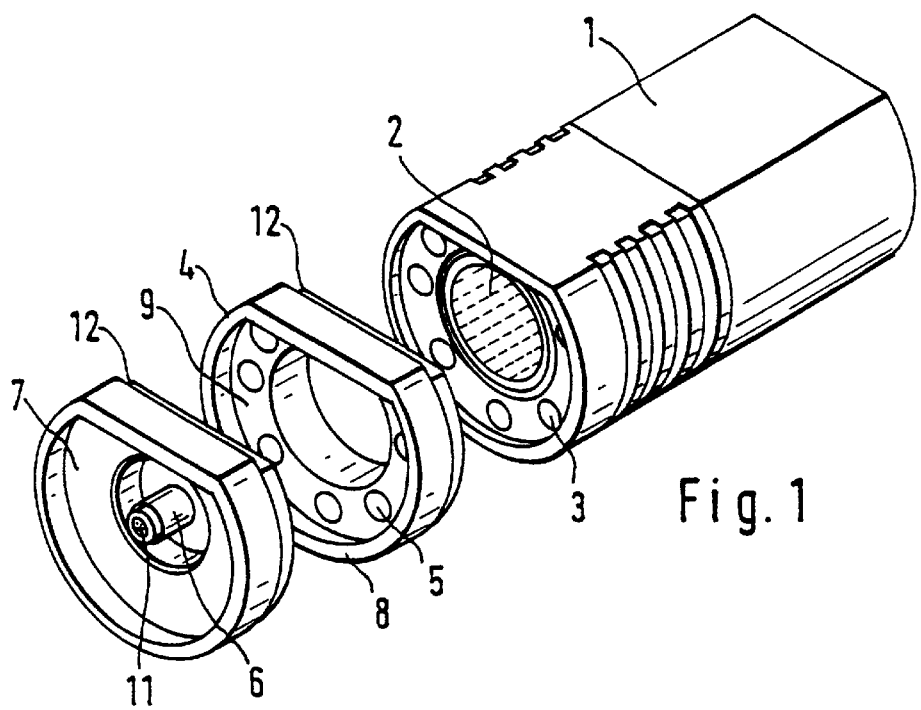
FIG. 1 depicts a front-view of an inventive device for optically connecting one end of an optical fiber with an optical component by means of a spacer element.

In the example, shown in FIG. 1, adapter 7 has a D-shaped body and a portion 12 being lifted and also D-shaped but with a smaller diameter than the D-shaped body.

Spacer ring 4 also has a D-shaped body and a recess 8 smaller in diameter than the D-shaped body with an inner diameter exactly fitting to lifted portion 12 of adapter 7 under a well-defined orientation to each other. The backside of spacer ring 4, opposite to the recess 8, also constitutes a D-shaped portion 12 being lifted and fitting accurately in a recess of the optical power sensor 1. As will be seen from FIG. 1, the lifted portion 12 of adapter 7 and spacer ring 4 is of the same dimensions and exactly fits into the recess of optical power sensor 1.

It will be understood that lifted portion 12 and its recessed counterparts may have any other non-symmetrical cross-section perpendicular to the optical axis and thereby indicating how to make an optical connection under a well-defined orientation. A D-shaped non-symmetrical cross-section of lifted portion 12 makes it easily visible for an operator how to connect the device with the spacer ring and/or another optical component. Further, it will be understood that the body of the adapter, spacer element or the measuring instrument may have a different shape than being D-shaped. For example, the body may have a symmetrical cross-section and may then be provided with an indication how to insert in the body of another optical component or element. A preferred option is that D-shaped body and lifted portion have the same orientation and are not wrenched to each other, since this makes it easy for an operator to connect the proposed optical elements. The non-circular part of the D-shaped portion constitutes a surface for good orientation on how to connect the optical elements.

Lifted portion 12 has a plane surface 12R to allow precise alignment relative to a recess 8 also comprising a plane surface 9 and engaging in lifted portion 12. Lifted portion 12 consists of a ferromagnetic material and is attracted by magnets 3 and 5 being arranged in the plane surface of each recess of the spacer ring 4 and the power sensor 1.

It is preferred to arrange the magnets 3 and 5 a bit below the surface of each recess to assure that only the plane surfaces contact each other.

Another option is to provide the lifted D-shaped portions 12 with magnets instead of its counterparts and to use a ferromagnetic material for the counterparts.

The recess in adapter 7 may be omitted, when adapter 7 is permanently connected with the end of optical fiber 11 and if it is not necessary to make a connection to another optical component holding the end of the optical fiber during operation.

If necessary, metal parts of optical components 1, 4 and 7 may be covered with plastics to avoid corrosion or an electrical short circuit. Also plastics may be used to hold the magnets 3, 5 in bore holes of the recess.

Figure 2:
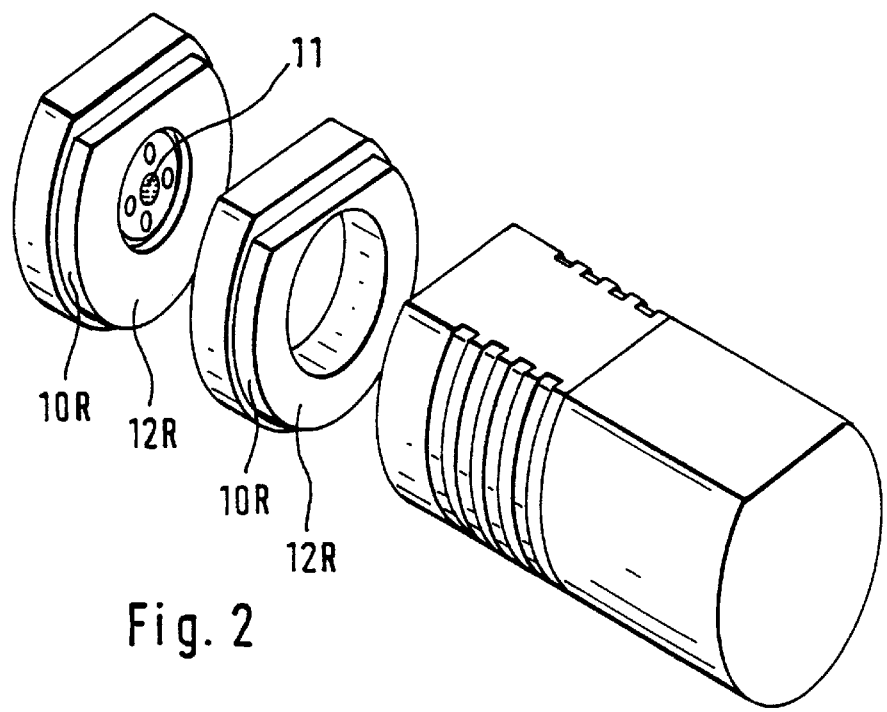
FIG. 2 shows a back-view of the inventive device, the spacer element and the optical component depicted in FIG. 1.

FIG. 2 is a back view of the inventive device 7, spacer element 4 and optical power sensor 1 shown in FIG. 1 and enables a better view on the lifted D-shaped portions 12 of adapter 7 and spacer ring 4. It further shows the location of the end 11R of optical fiber 11 in adapter 7, and the plane surface 12R of the lifted D-shaped portion 12 of the adapter 7 and the plane surface 12R of the lifted D-shaped portion 12 of the spacer element 4. Positions 10R depict the circular part of the lifted D-shaped portions 12 of adapter 7 and spacer ring 4.

We claim:

1. A device for optically connecting one end of an optical fiber with an optical component, said device comprising:

an adapter with a guide for holding said optical fiber in a predetermined position relative to an optical axis of said optical component, said adapter further comprising at least a portion having a non-symmetrical cross-section which is shaped to engage a mating counterpart of said optical component, and magnetic means for acting as a sole means to join said adapter to said optical component.

2. A device according to claim 1, wherein said optical component comprises a housing having a first end and a second end, said first end shaped to mate with said portion having a non-symmetrical cross-section so as to allow easy alignment of said adapter relative to said optical component.

3. A device according to claim 1, wherein said optical component is a an optical power sensor with a photodiode arranged on an optical axis of said optical fiber.

4. A device according to claim 1, wherein said optical component is a spacer element, said second end having a non-symmetrical cross-section for engaging with a counterpart of a further optical component.

5. A device according to claim 1, wherein at least one of said adapter and/or said component comprise a raised D-shaped portion for engaging in a recessed D-shaped counterpart of said optical component.

6. A device according to claim 5, wherein at least said raised D-shaped portion comprises a ferromagnetic material.

7. A device according to claim 6, wherein said counterpart of said optical component comprises one or more magnets for fixing said raised D-shaped portion in said counterpart.

8. A device according to claim 1, wherein said non-symmetrical portion and said counterpart comprise a plane surface.

9. A device according to claim 8, wherein said plane surface comprises at least one magnet arranged below said plane surface.

10. A device according to claim 9, wherein at least one of said adapter and/or said optical component is at least partly comprised of plastic.

\* \* \* \* \*